Sept. 8, 1925.
F. C. KINGSTON
1,552,615
TIRE INFLATING VALVE
Filed Sept. 12, 1921
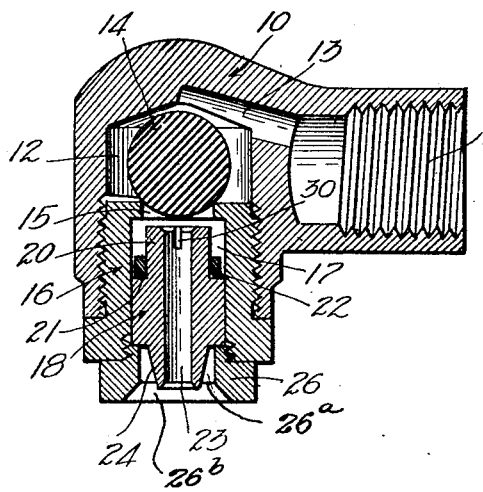
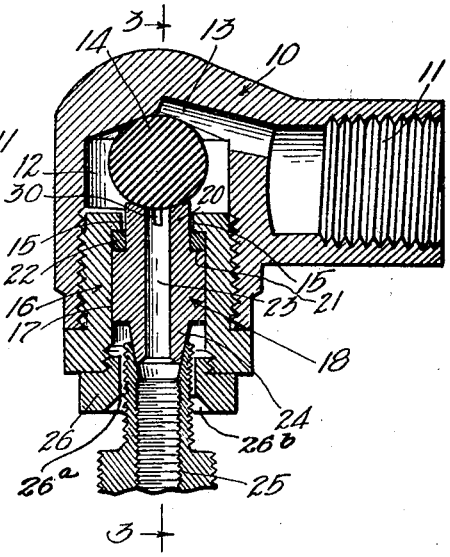
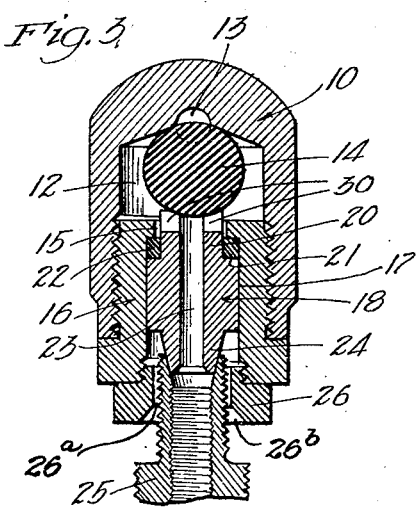
Inventor:
Frederick C. Kingston,
By James T. Blakeley
his Attorney Patented Sept. 8, 1925.

1,552,615

UNITED STATES PATENT OFFICE.

FREDERICK C. KINGSTON, OF LOS ANGELES, CALIFORNIA.

TIRE-INFLATING VALVE.

Application filed September 12, 1921. Serial No. 500,140.

*To all whom it may concern:*

Be it known that I, FREDERICK C. KINGSTON, a citizen of the United States, residing at Los Angeles, in the county of Los Angeles and State of California, have invented new and useful Improvements in Tire-Inflating Valves, of which the following is a specification.

This invention relates to the valve devices used on the end of air pressure hose, and adapted to be put into engagement with a tire valve stem, for the purpose of inflating a tire. Various forms of such valve devices have been proposed, and some placed upon the market; but they have certain disadvantages, which it is the object of the present invention to overcome. There are various of these shortcomings and corresponding advantages of my invention; and the objects and advantages of my invention will probably be best and most readily understood from the following detailed description where I set out a preferred form of valve device embodying the invention.

One of the greatest shortcomings of the devices now in use is their inefficiency in making an easy but good joint with the tire valve stem. They usually engage the outer surface or the end of the stem—both subject to mutilation and deformation—and some are rather hard to remove from the stem. It is a feature of my device that it engages the interior of the stem, makes a good joint, and is easily applied and removed. It may be preliminarily remarked that an object of the invention is to provide a simple and durable form of valve device; one that is trustworthy and reliable in its action; inexpensive to manufacture; and having no parts that have to be renewed frequently. It is one of the chief objections to various of the devices now in use, that they contain certain parts that must be renewed very frequently. For instance, they use a rubber gasket to engage the valve stem and this gasket must be renewed frequently. My invention uses metal parts to engage the valve stem, arranging those parts so that they cannot mutilate the stem. And it is also an object to provide a small device; one that, for instance, can be readily used in the restricted space between the spokes of wire wheels.

For the purpose of the following detailed description of a preferred and specific type of a valve embodying my invention, I refer to the accompanying drawings in which—

Fig. 1 is a central longitudinal section of my improved device in its normal position when not in use; Fig. 2 is a similar section showing the device in its position of use; and Fig. 3 is a section taken on line 3—3 of Fig. 2.

In the drawings the numeral 10 designates a body having an air passage therethrough, which air passage may be roughly described as being L-shaped. One end of this air passage is, as indicated at 11, adapted for connection with a fluid pressure hose; and another part of the air passage forms the valve chamber 12. Between the part 11 and the valve chamber 12 there is a passage (in the form of a drilled bore) 13 which delivers the air pressure from passage 11 over and on top the ball valve 14 in the chamber 12. Normally this ball valve 14 is seated, and is held on its seat by the air pressure; seating on the upper side of a valve seat opening 15. This opening 15 is formed in the upper end of a bushing 16 that is screwed up into the body 10, as illustrated. The cylindrical bore 17 of this bushing is concentric with valve seat opening 15; and this cylindrical bore forms a cylindrical guide for a sliding nozzle member or plunger 18. This plunger 18 normally stands in the position shown in Fig. 1, and in that position its reduced upper end portion 20 stands below the valve seat opening 15, so that it does not interfere with the proper seating of the valve 14. At the shoulder 21 the member 18 is provided with a rubber gasket 22. Plunger 18 has a longitudinal air passage bore 23; and has at its lower end a conical nozzle 24 that is adapted to enter and fit into the interior of the upper end of a tire valve stem 25. These valve stems, of course, have their interiors threaded to receive their valves; but at the upper end there is usually a part which is not threaded; and it is this part that the conical nozzle 24 is adapted to fit.

The plunger 18 is prevented from dropping out of bushing 16 by another bushing 26 screwed into the lower end of bushing 16; this bushing 26 performing also the office of guide member for the upper end of the valve stem when the valve device is placed upon the valve stem, as indicated in Fig. 2.

When the device is not in use, the air pressure on top the ball valve 14 holds it down upon the valve opening 15, seating it upon the upper side of the seat surrounding the opening 15. I propose to use a ball as a valve; although any circular valve member might be used; because the ball, no matter how it may roll around, is always in position to close the valve opening. I also preferably use a ball made of comparatively soft rubber, as I find that such a material will tightly seal the opening and will also have a comparatively long life. Of course, any other suitable material may be used. When the device is not in use the plunger 18 usually stands in the position shown in Fig. 1, although it may move back and forth loosely in the bore 17.

When the device is put into use, it is placed upon the tire valve stem, in the position indicated in Fig. 2, the tire valve stem being guided into correct position by the guiding bushing 26. Bushing 26 has a bore 26$^a$ surrounding the lower tapered end 24 of plunger 18, bore 26$^a$ being of somewhat larger diameter than the exterior of valve stem 25. At the lower end of this bore, and beginning at a point about level with the normal position of the lower end of tapered part 24, is a downwardly flaring mouth 26$^b$. When the device is applied to a valve stem this flaring mouth guides the stem to central position by contacting with the outer edge of the stem's upper end, not engaging the upper flat end surface of the stem and therefore not mutilating it. By the time the upper end of the stem has reached a position nearly level with the lower end of bore 26$^a$ it has been guided onto the lower smaller end of tapered part 24, and then on further movement of the stem up into the device, tapered part 24 entering the valve stem centers it and prevents the exterior threads of the valve stem from coming into contact with the wall of the bore 26$^a$. The nozzle 24 engages on the inside of the end of the tire valve stem; and as the whole device is pressed upon the valve stem, the plunger 18 is pressed back to the position shown in Fig. 2; in which position the valve 14 is raised entirely off its seat and the upper gasket 22 is pressed upwardly against the lower side of the valve seats surrounding the opening 15. I prefer to use a comparatively soft rubber for the gasket 22, although other suitable material can be used; as such a material easily makes a fluid-tight joint with the lower side of the valve seat, without the necessity of the operator exerting an excessive pressure. It will be seen that this gasket 22, seating against the lower side of the seat, prevents the escape of air from the valve chamber 12 around the plunger 18. When the device is in the position shown in Fig. 2, then the air pressure may readily flow from the valve chamber 12, into the longitudinal bore 23, flowing through a transverse slot 30 to enter the upper end of bore 23. It will be seen that the upper end of this bore, when the device is in the position shown in Fig. 2, is closed by the valve ball 14; so that air pressure cannot directly enter the upper end of the bore. It is only necessary to provide a transverse opening (an opening that will not be covered by the ball) into the longitudinal bore, and I prefer for this purpose to drill the bore clear through the member 18 and then provide the slot 30. The air flowing through bore 23 finds its way directly into the interior of the tire valve stem 25. As soon as the desired amount of inflation is accomplished, the whole device is removed from the tire valve stem, whereupon the air pressure on the ball 14 forces it on to its seat, the plunger 18 being returned to its normal position as shown in Fig. 1.

One of the distinctive features of this device is that it utilizes a nozzle which enters the end of the tire valve stem rather than which surrounds it or presses flatly upon its end, as in most of the present devices. All such present devices require that their plunger or gasket or other parts that engage the tire valve stem shall be very frequently renewed. It will be noted that, by using a conical nozzle, I am able to use a metal fit, as between the nozzle and the tire valve stem; at the same time on account of the conical form of the nozzle, I am able to obtain a fluid tight joint between these parts without the necessity of the operator exerting excessive pressure on the device. Furthermore, this conical nozzle is subject to very little or no wear, so that practically it does not need replacement at all. Further this interiorly entering conical nozzle engages the inside of the valve stem end, above its interior threads (so as not to mutilate the threads) and thus does not depend for its tight fit on fitting the exterior or end of the valve stem, which surfaces commonly become mutilated and deformed. And also, if the valve stem end is slightly deformed, my conical nozzle tends to round it out to proper shape again. The rubber ball 14 and the rubber gasket 22 are not subjected to any great wear, the gasket 22 being subjected only to simple compression, which is likewise true of the rubber ball. Consequently these parts last a very long time; and when the rubber in them becomes deteriorated, they are very easily replaced.

I have given a complete and detailed description of one specific and preferred form of device embodying my invention, in order that my invention may be fully and completely understood, and not for necessarily limiting my invention to this particular form of it.

Having described a preferred form of my invention, I claim:—

1. A device of the character described, comprising a body with a passage one end of which is adapted for connection to a fluid pressure supply, a valve seat in the body, a valve seating on the seat, a tubular slidable member in the body under the valve and adapted by longitudinal movement toward the valve to lift the valve off its seat, the lower end of the member being tapered to enter a tire valve stem, and an annular valve stem guide having a bore, somewhat larger than the exterior diameter of the valve stem, concentrically surrounding the conical end of the member, and the lower end of the guide bore, from a point about level with the lower end of said member, flaring downwardly to guide the valve stem onto the end of said member.

2. A device of the character described, comprising a body carrying a tubular tire-valve-stem-engaging member with a lower tapered end adapted to enter the end of the valve stem, and an annular valve stem guide concentrically surrounding the tubular member extending somewhat below it, having an internal opening somewhat larger than the exterior diameter of the valve stem, and having at the lower end of its opening a downwardly opening conical part, the upper end of the conical part being about on a level with the lower end of the tubular member.

In witness that I claim the foregoing I have hereunto subscribed my name this 29th day of August 1921.

FREDERICK C. KINGSTON.